United States Patent
Venkatachalam et al.

(10) Patent No.: US 11,627,626 B2
(45) Date of Patent: Apr. 11, 2023

(54) NETWORK REDUNDANCY USING ALTERNATE NETWORK UPLINKS

(71) Applicant: Hewlett Packard Enterprise Development LP, Houston, TX (US)

(72) Inventors: Anandhakumar Venkatachalam, Bangalore (IN); Mugilan Jeyaraman, Bangalore (IN); Sasindran Devaraj, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 85 days.

(21) Appl. No.: 17/182,498

(22) Filed: Feb. 23, 2021

(65) Prior Publication Data
US 2021/0274582 A1    Sep. 2, 2021

(51) Int. Cl.
*H04W 76/18*    (2018.01)
*H04W 88/08*    (2009.01)

(52) U.S. Cl.
CPC ............ *H04W 76/18* (2018.02); *H04W 88/08* (2013.01)

(58) Field of Classification Search
CPC ..... H04W 76/18; H04W 88/08; H04W 24/04; H04W 76/15; H04W 76/19
USPC ......................................................... 370/328
See application file for complete search history.

(56) References Cited

U.S. PATENT DOCUMENTS

| | | | |
|---|---|---|---|
| 5,859,959 A * | 1/1999 | Kimball | .............. H04L 45/28 709/239 |
| 7,953,883 B2 | 5/2011 | Thomas et al. | |
| 8,477,645 B2 | 7/2013 | Scherzer et al. | |
| 9,807,627 B2 | 10/2017 | Elliott et al. | |
| 9,886,839 B2 | 2/2018 | Martin | |
| 2006/0135068 A1* | 6/2006 | Jaakkola | ............... H04W 48/16 455/516 |
| 2008/0310311 A1* | 12/2008 | Flammer | ................. H04L 45/00 370/238 |
| 2015/0222709 A1* | 8/2015 | Thielen | ................... H04L 69/18 709/227 |
| 2018/0368058 A1 | 12/2018 | Huang et al. | |

OTHER PUBLICATIONS

Sewak, A. et al., Adhocinfra Toggle: Opportunistic Auto-configuration of Wireless Interface for Maintaining Data Sessions in Wifi Networks, Sep. 14, 2017, 15 Pgs.

* cited by examiner

*Primary Examiner* — Huy C Ho
(74) *Attorney, Agent, or Firm* — Jaffery Watson Mendonsa & Hamilton

(57) ABSTRACT

Embodiments are directed to network redundancy using alternate network uplinks. An embodiment of a wireless access point includes one or more processors; a wireless transmitter and receiver; and a connection for a network uplink, the wireless access point to: transmit a request to multiple devices connected to the wireless access point regarding redundant network links; identify one or more devices that include redundant network links and are capable and willing to provide alternate network uplinks, including a first device including a first redundant network link; provide a network operation for one or more devices using the network uplink; upon detecting a loss of the network uplink, transmit a request to at least the first device to enable a first alternate network uplink using the first redundant network link; and transmit and receive data for the network operation through the first device for the first alternate network uplink.

19 Claims, 9 Drawing Sheets

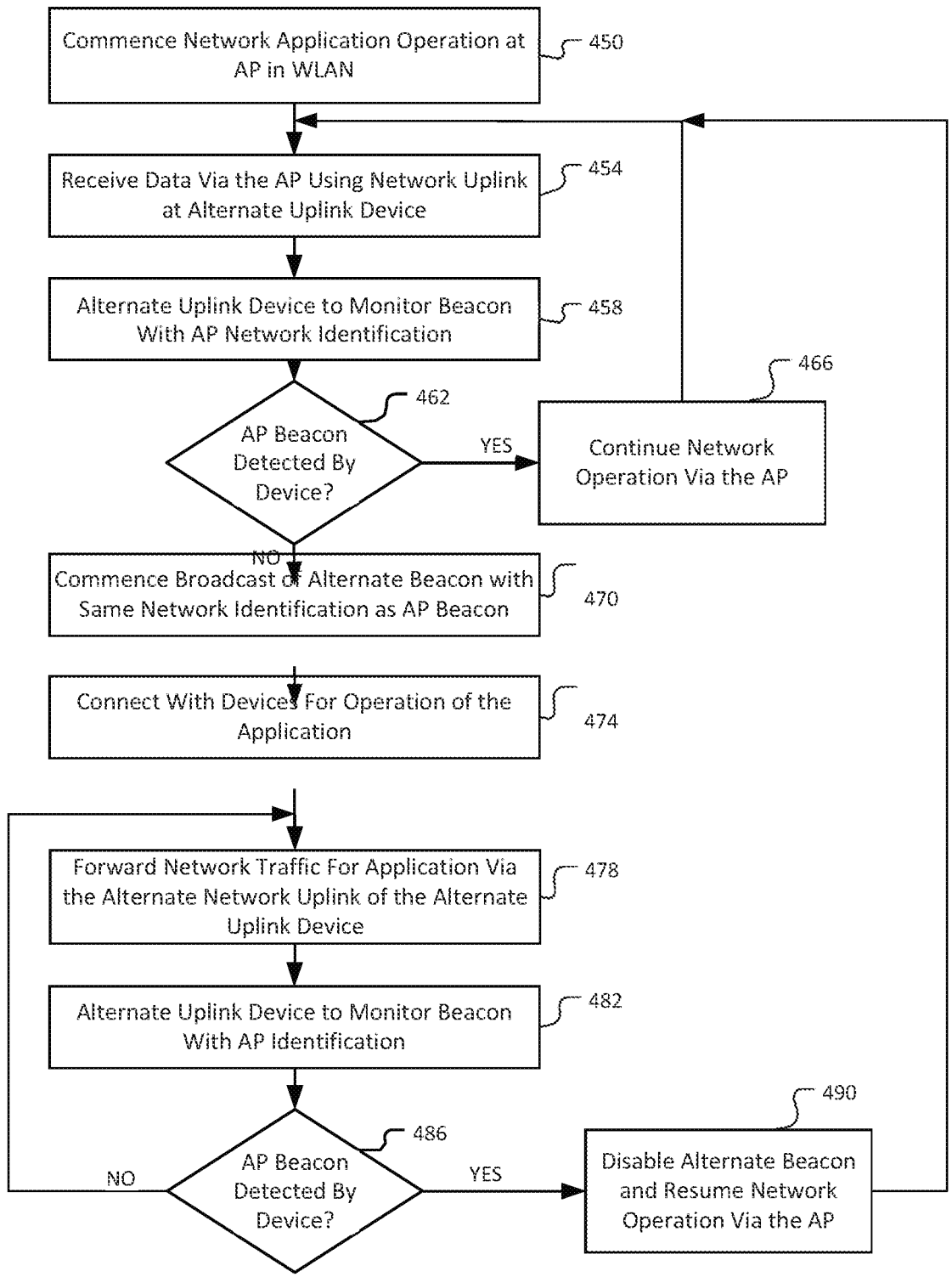

NETWORK REDUNDANCY USING ALTERNATE NETWORK UPLINKS

BACKGROUND

A shared network operation, which may include a shared streaming operation, may be utilized for a web meeting or other function supporting multiple devices. For example, a shared streaming operation providing data to multiple devices may be supported by a certain device accessing the Internet through a network connection provided by an access point.

However, the loss of the network connection provided by the access point, whether by loss of the network uplink or failure of the access point, can result in interruption or termination of the shared application session.

In such a scenario, another network connection may be available through a different connection or through a different access point, but use of this network connection generally will require a restart or reboot of the session, and will require that the session participants take action to continue use of the shared application. Further action will be required to return to the original network access if and when the original network access is restored.

Thus, the interruption of a shared application session can result in a noticeable interruption in service, which can significantly impair user experience in an application, particularly if a network connection is unstable for any reason, and thus may be interrupted periodically.

BRIEF DESCRIPTION OF THE DRAWINGS

Embodiments described here are illustrated by way of example, and not by way of limitation, in the figures of the accompanying drawings in which like reference numerals refer to similar elements.

FIG. 4B is a flow chart to illustrate a process for operation of alternate network uplinks for access point failure, according to some embodiments;

DETAILED DESCRIPTION

Figure 1:
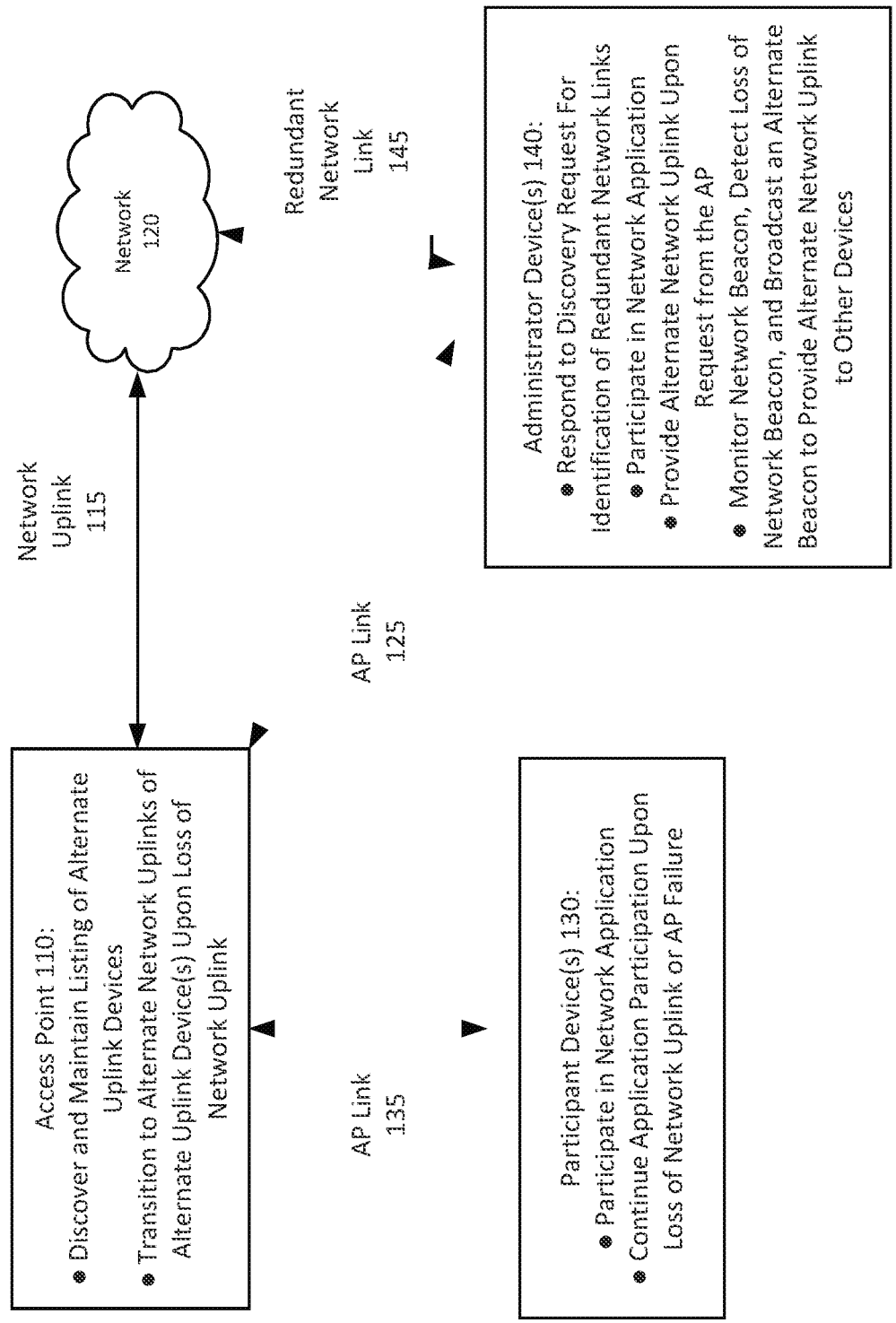
FIG. 1 is an illustration of an elements for network redundancy using alternate network connections, according to some embodiments.

Embodiments described herein are directed to network redundancy using alternate network uplinks.

In some embodiments, an apparatus, system, or process operates to provide network redundancy in circumstances in which multiple devices are involved in a session utilizing a network, such as the Internet, and wherein at least one of the multiple devices has a redundant connection to the network. The apparatus, system, or process is to provide one or more alternate paths to the network via one or more devices to enable immediate continuation of a network application, such as streaming using a streaming device (such as Chromecast device or Apple TV) via an access point (AP), if there is a loss of network connectivity because the network uplink is lost or if the access point stops operating. In this scenario, the network application supports multiple devices in a session, such as in web meeting application.

In some embodiments, an apparatus, system, or process is to identify any connected devices that have redundant network links (wherein a redundant network link is a network link that is present in addition to a network connection via an access point) and are capable of and willing to forward network traffic through an alternate network connection (which may be any wireless, such as 4G/5G cellular, or a wired Internet connection) using the redundant network link. In some embodiments, the apparatus, system, or process is further to generate an alternate uplink device list of qualifying alternate uplink devices. As used here, an alternate uplink device is a device having a redundant network link and being capable and willing to route traffic for a network application through the redundant network link, which is then referred to an alternate network uplink. Streaming for connected devices may continue uninterrupted through one or more identified alternate uplink devices (which have a role that may be referred to as an administrator (admin) device) while the original network uplink is unavailable. In some embodiments, this operation may be provided with users being unaware of the fallback to the alternate network uplinks. In some embodiments, the traffic for the network application may then revert to the original network uplink upon the network connection being restored.

Implementations for alternate network uplink operations may include the following:

(1) Loss of Network Uplink—In some embodiments, upon an AP network uplink being lost, the AP is to forward all network traffic through one or more of the alternate uplink devices until the uplink connectivity is recovered. A packet/command may be sent to the one or more admin devices to enable and disable the alternate network uplink operation.

(2) Failure of Access Point—In some embodiments, admin devices (i.e., the alternate uplink devices) are to monitor access point beacons for a network identifier, such as an SSID (Service Set Identifier) in a particular example of an IEEE (Institute of Electrical and Electronic Engineers) 802.11 wireless local area network (WLAN), that the admin devices are associated with. Upon the AP beacon being lost (such as upon the AP failing because of power failure, hardware or software malfunction, or other reasons), the admin devices are to broadcast alternate beacons with the same network identifier, thus causing other devices to roam to the one or more alternate network uplinks. In some embodiments, the alternate network uplink operation is to continue until the AP operation is recovered, at which time the alternate beacons are to be disabled, thus causing the devices in the network session to roam back to the AP.

In some embodiments, an implementation includes alternate network uplink operation for both (1) loss of the network uplink and (2) access point failure to address the loss of network connectivity for either circumstance.

As used herein, access point (AP) (also referred to as a wireless access point (WAP)) refers to a networking hardware device that allows devices to connect to a wired network, including connection to the Internet or an intranet. The AP may connect to a router (via a wired network) as a standalone device or may be an integral component of the router itself.

Figure 3:
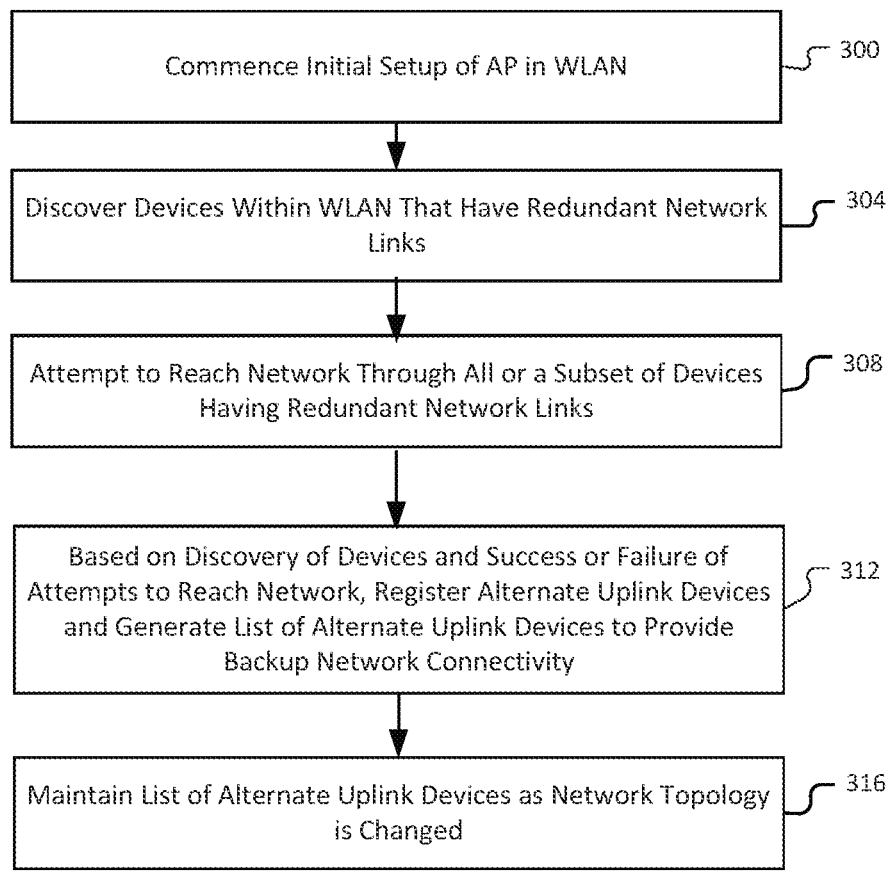
FIG. 3 is a flow chart to illustrate a process for registration for alternate network connections, according to some embodiments.
Figure 4A:
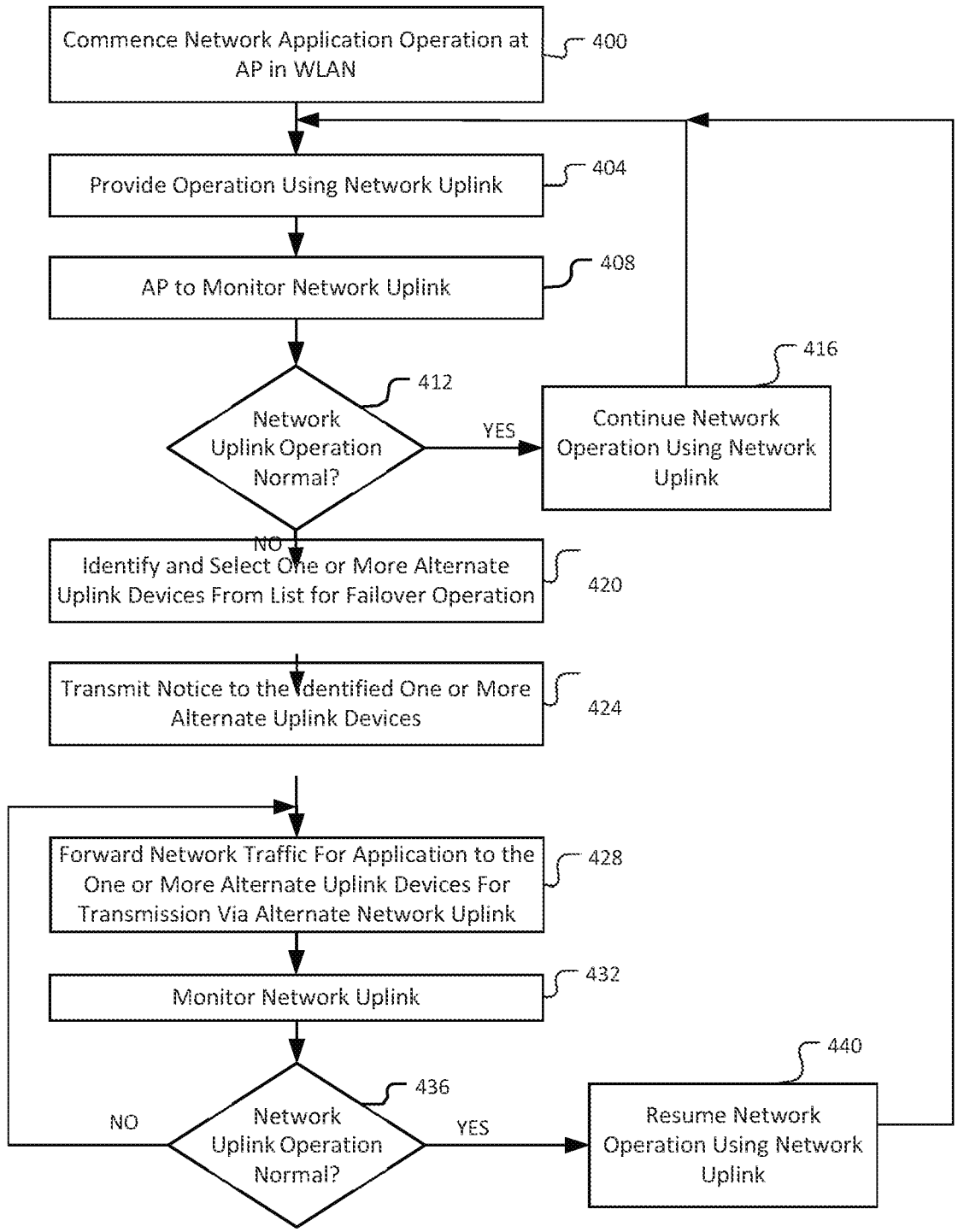
FIG. 4A is a flow chart to illustrate a process for operation of alternate network uplinks for network uplink failure, according to some embodiments.

FIG. 1 is an illustration of an elements for network redundancy using alternate network connections, according to some embodiments. In some embodiments, a system may include an access point 110, wherein the access point is to provide for discovering and maintaining a listing (which may be in the form of a table, database, register settings, or other format) of alternate uplink devices, such as illustrated in FIG. 3 for discovery and registration of alternate uplink devices. The access point 110 provides access to a network uplink 115 for connection of client devices to a network 120, wherein the network may commonly be the Internet. In some embodiments, the access point 110 is further to provide for transitioning to one or more alternate network uplinks of alternate uplink devices upon detecting a loss of the network uplink 115, such as illustrated in FIG. 4A for operation of alternate network uplinks for network uplink failure.

In some embodiments, the system may further include one or more devices that may participate in a network application, such as in streaming operations. The devices include one or more admin devices 140 that utilize an AP link 125 for network operation through the access point. The admin devices each further include a redundant network link 145, the admin devices to respond to a discovery request by the access point 110 to indicate capability and willingness to act as an alternate network uplink when required. In some embodiments, the admin devices 140 are to provide for an alternate network uplink upon receiving a request from the access point 110, such as illustrated in FIG. 4A for operation of alternate network uplinks for network uplink failure.

It is noted that, in case of AP uplink failure, data traffic will then flow to the access point and then to the alternate link device. However, the alternate device should not then send the traffic back to the access point, which would normally occur in conventional operations. In some embodiments, an access list is applied dynamically to avoid this return traffic flow. Instead, the alternate link device will then forward the data traffic to the Internet via its alternate network uplink, and thus continue operation of the network application.

In some embodiments, the admin devices 140 may further provide for monitoring a network beacon of the access point (referred to herein as the access point (AP) beacon) 110, detecting a loss of the AP beacon, and broadcasting an alternate beacon with a same network identifier as the AP beacon to enable the provision of an alternate network uplink to connected devices, such as illustrated in FIG. 4B for operation of alternate network uplinks for access point failure.

The connected devices may further include other devices (referred to as participant devices) 130 utilizing an AP link 135 with the access point 110, wherein the participant devices 130 are not admin devices as they do not include redundant network connections, or are either unable or unwilling to act as an alternate network uplink for other devices. The participant devices 130 may participate in a network application, and are able to continue participation in the network application upon loss of the network uplink or access point failure through use of an alternate network uplink, such as illustrated in FIG. 4A or 4B.

Figure 2A:
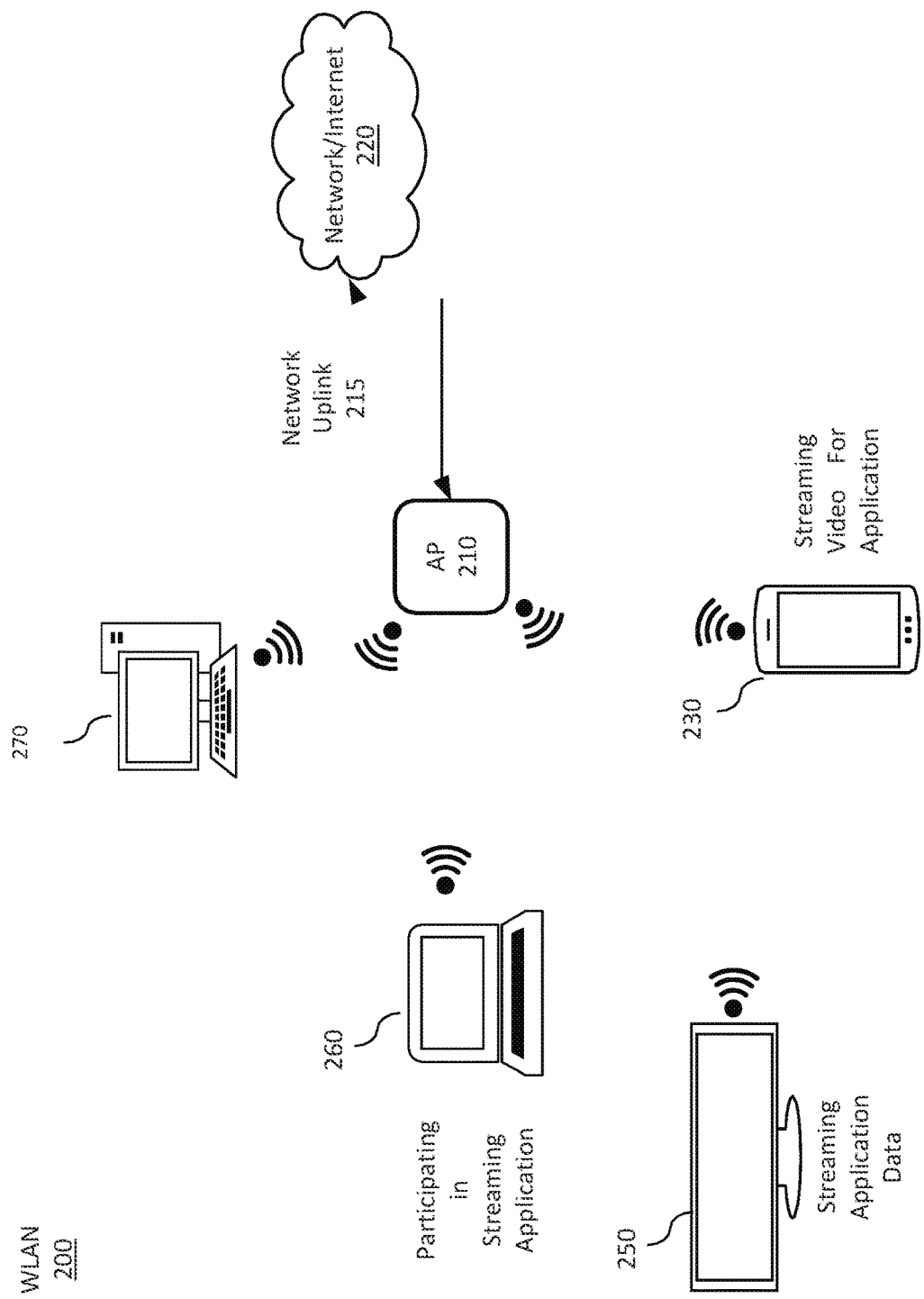
FIG. 2A is an illustration of network devices participating in a network operation, according to some embodiments.

FIG. 2A is an illustration of network devices participating in a network operation, according to some embodiments. In some embodiments, a wireless local area network (WLAN) 200 includes an access point 210 to provide a network uplink to a network, such as the Internet 220. Also illustrated in FIG. 2 are a mobile device 230 (such as smart phone), a display apparatus 250 that may present a network application, such as a streaming application for multiple computing devices, a laptop computer 260, and a desktop computer 270. A network may include multiple other elements that are not illustrated in FIG. 2A.

In an example operation, the mobile device 230 is being utilized to stream (such as by utilizing Chromecast or another technology) a multi-device streaming network application (such as a web conference application) to the display apparatus 250, which may include a Chromecast device. The network application is streamed via the access point 210 utilizing the network uplink 215 to the Internet (or other network) 220. In this example, the laptop 260 is also participating in the network application.

However, the network connection provided through the access point 210 may be lost for a certain amount of time, which may occur as result of loss of the network uplink 215 or failure of the access point 210. In either case, the loss of the Internet connection will result in interruption of the network application, and loss of Internet connection for the display apparatus 250 and the laptop computer 260.

Figure 2B:
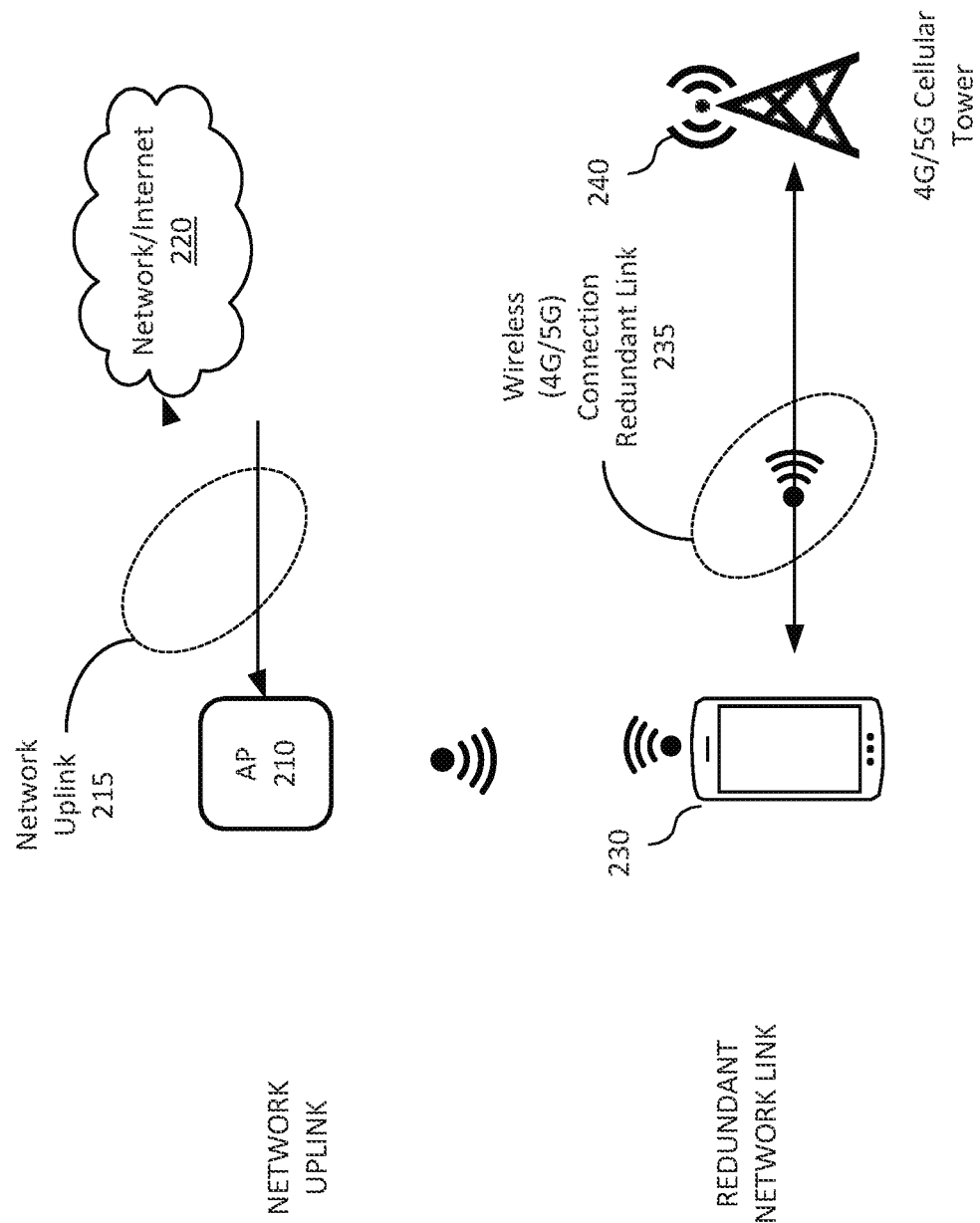
FIG. 2B is an illustration of network redundancy using an alternate network uplink, according to some embodiments.
Figure 2C:
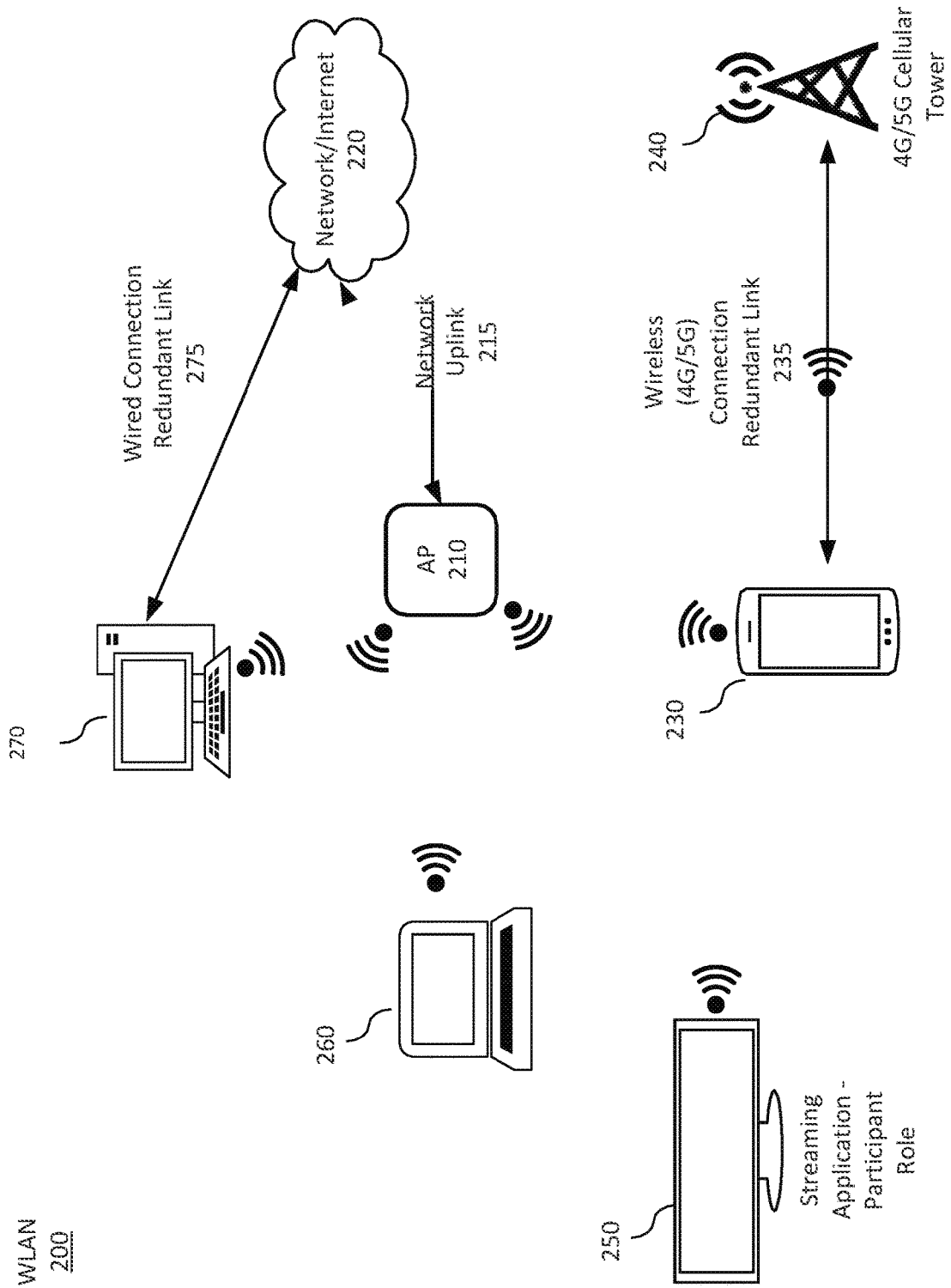
FIG. 2C is an illustration of network redundancy using alternate network connections in a streaming operation, according to some embodiments.

In some embodiments, the access point 210 is to discover one or more alternate link devices that are capable of providing alternate network uplinks, as illustrated in FIG. 2B, upon a loss of the network connection. In some embodiments, the one or more alternate link devices are utilized to provide continued network operation using one or more alternate network uplinks upon the loss of the network connection, as illustrated in FIG. 2C.

FIG. 2B is an illustration of network redundancy using an alternate network uplink, according to some embodiments. As illustrated in FIG. 2B, an access point 210 provides a network uplink 215 to a network, such as the Internet 220. In some embodiments, the access point 210 is to discover redundant network links that may be utilized in circumstances in which the network link provided by the access point is lost. More specifically, the access point 210 is to discover and register devices that have an redundant connection to the Internet and that are capable and willing to provide an alternate Internet uplink for other devices when the network uplink 215 is not available, either because the network uplink is down or because the access point 210 has stopped operating.

In an example, a mobile device 230, in addition to having access to the network link provided by the access point 210, also includes a redundant Internet link in the form of a redundant wireless connection 235, such as the illustrated 4G or 5G cellular connection 235 connecting via the illustrated cellular tower 240. In some embodiments, the access point 210 is to discover the mobile device 230, such as by receiving a response to a request, as being capable and willing to provide an alternate network uplink for a network application when required.

In some embodiments, upon the network connection via the access point 210 becoming unavailable, data for a network application that would normally be transmitted or received via the access point 210 using the network uplink 215 will automatically be transitioned to the mobile device 230 so that the data can be transmitted or received via the mobile device 230 using the redundant wireless link 235. While the particular example illustrated in FIG. 2B regards a redundant wireless network link, a device may instead (or additionally) include a redundant wired connection to the Internet that may be utilized as an alternate network uplink.

FIG. 2C is an illustration of network redundancy using alternate network connections in a streaming operation, according to some embodiments. In some embodiments, a wireless local area network (WLAN) 200 includes an access point 210 to provide a network uplink 215 to a network, such as the Internet 220. Also illustrated are a mobile device 230 (such as smart phone), a display apparatus 250 that may present a network application, such as a streaming application for multiple devices, a laptop computer 260, and a desktop computer 270.

In some embodiments, the access point 210 is to discover and register devices that have redundant network links to the Internet and that are capable and willing to provide an alternate Internet link to connected devices, such as illustrated in FIG. 2B. In this example, the mobile device 230 includes an alternate Internet link in the form of a redundant wireless connection (for example, a 4G or 5G cellular connection) 235 connecting via the illustrated cellular tower 240, and the desktop computer 270 includes an alternate Internet link in the form of a wired connection redundant link 275. In some embodiments, the access point 210 is to discover the mobile device 230 and the desktop computer 270, such as by receiving responses to a request, as including redundant network links, and being capable and willing to provide alternate Internet links for other devices.

The mobile device 230 and the desktop computer 270 thus are registered as alternate uplink devices, and may be utilized to provide alternate network uplinks for other connected devices when the original network connection (via the access point 210 and the network uplink 215) is not available, as follows:

Loss of Network Uplink: The access point 210 is to provide for transitioning the connected devices to one or more alternate network uplinks of alternate uplink devices, such as mobile device 230, desktop computer 270, or a combination of both, upon detecting a loss of the network uplink 215, such as further illustrated in FIG. 4A for operation of alternate network uplinks for network uplink failure. The alternate uplink devices 230 and 270 may provide for an alternate network uplink upon receiving a request from the access point 210. In some embodiments, the application data from users is received by the access point 210, which then transmits such data to the one or more alternate uplink devices for transmission via the alternate network uplink.

In the circumstance of loss of the network uplink, data traffic from users thus flows to the access point 210 and then to the alternate uplink device. In some embodiments, an access list is applied dynamically to avoid return of the data to the access point, with, the alternate uplink device then forwarding the user traffic to the Internet via its alternate uplink connection. Similarly, data to be transmitted to users is received by the alternate uplink devices, transmitted to the access point 210, and then transmitted to the connected devices. In this manner, the streaming application can continue without interruption, and may proceed without action or knowledge of users. In some embodiments, the streaming application data for each alternate uplink device may be transmitted and received via the alternate Internet link of the alternate uplink device without transmission via the access point 210 to avoid unneeded data transfers.

Access Point Failure: In some embodiments, the alternate uplink devices 230 and 270 may further provide for monitoring of a network beacon having a particular network identification (such as an SSID) of the access point 210. Upon detecting a loss of the network beacon (such as detecting that the beacon has not been received for a certain time period), the alternate uplink devices 230 and 270 are to broadcast an alternate beacon with a same network identifier as the network beacon to enable the provision of an alternate network uplink to connected devices, such as illustrated in FIG. 4B for operation of alternate network uplinks for access point failure.

In operation, the other devices will recognize the identification of the alternate beacon and will roam to the alternate uplink device. In some embodiments, the alternate uplink devices will continue to monitor for the original beacon, and, upon detecting resumption of the network beacon, the alternate uplink devices can disable broadcast of the alternate beacon, thus allowing the devices to roam back to the access point. In this matter, the streaming application can again continue without interruption, and may proceed without action or knowledge of users.

FIG. 3 is a flow chart to illustrate a process for registration for alternate network connections, according to some embodiments. In some embodiments, a process for discovery and registration of alternate network connections includes commencing initial setup of an access point 300, such as following initial power on or restart of the access point. The access point may include, for example, access point 210 illustrated in FIGS. 2A-2C operating in a network with multiple connected network devices, with the access point to provide a network uplink to the Internet or another network.

In some embodiments, the access point is to discover any devices within a WLAN that include redundant network links 304. The redundant links may include both wired and wireless network connections, such as the redundant wired Internet connection of desktop computer 270 and the redundant wireless network connection of mobile device 230 in FIG. 2C. The discovery process performed by the access point may include broadcasting a request for a response from any device connected to the access point that includes a redundant network link, and that is capable and willing to provide an alternate network uplink for other devices. The access point is to utilize the responses to the request to identify potential devices. In some embodiments, the process may further include the access point then to attempt to reach the network through all or a subset of the devices having redundant network links to identify devices that can successfully operate as alternate uplink devices 308.

In some embodiments, based on the discovery of any devices having redundant network links and the success or failure to reach the network via the redundant network links, the access point is to register devices as alternate link devices and generate a list of alternate uplink devices to provide backup network connectivity 312. The alternate link devices are to be utilized to provide alternate network uplinks in circumstances of failure of a network uplink, such as illustrated in FIG. 4A; in circumstances of access point failure, such as illustrated in FIG. 4B; or in both such circumstances. The access point is to maintain the list of alternate uplink devices as the network topology for the WLAN is changed 316, adding and removing alternate uplink devices as required.

FIG. 4A is a flow chart to illustrate a process for operation of alternate network uplinks for network uplink failure, according to some embodiments. In some embodiments, a network application operation, such as a streaming operation in an application, is commenced at an AP in a WLAN 400, including providing data communications via a network uplink of the AP 404. The network operation may include participation of multiple devices, such as illustrated in FIG. 2A. The AP is to monitor the network uplink during operation of the application 408, including detecting whether there are any abnormal conditions. The AP is to determine whether the network uplink is operating normally 412. If the network uplink is operating normally, the operation of the network application can continue using the network uplink 416.

However, if the network uplink operation is not normal 412, one or more alternate uplink devices from the maintained list alternate link devices (as illustrated in FIG. 3) are identified and selected for failover of the network operation 420. For example, multiple alternate uplink devices may be selected if required for load balancing of data transfers for the streaming application, or a single alternate uplink device may be selected if the data traffic is limited. The access point is then to notify the identified alternate uplink devices requiring the failover operation 424, and to forward the network traffic for the application to the one or more alternate uplink devices 428, thereby enabling the continued operation of the application for the connected devices, including the devices that do not have redundant network links. In some embodiments, the process includes applying an access list dynamically to avoid return of the traffic flow from the alternate uplink device to the access point, with the alternate uplink device instead forwarding the user traffic to the network via its alternate uplink connection.

In some embodiments, the access point is to continue monitoring the network uplink 432, and to determine whether the network uplink operation has returned to normal 436. If the network uplink has not returned to normal, the access point is to continue forwarding network traffic for the streaming application to the one or more alternate uplink devices 428.

Upon the network uplink operation returning to normal 436, the access point is to return to normal network operation, such as streaming of data, using the network uplink 440, thus returning to providing the application operation using the network uplink 404 and monitoring the network uplink 408.

FIG. 4B is a flow chart to illustrate a process for operation of alternate network uplinks for access point failure, according to some embodiments. In some embodiments, a network operation is commenced at an AP in a WLAN 450, including an alternate uplink device receiving application data via a network uplink of the AP 454. The application again may include operation of multiple devices. The alternate uplink device is to monitor the network beacon broadcast by the AP (referred to herein as the AP beacon) with the respective network identification (SSID) for the AP 458, and determine whether the AP beacon is detected by the alternate uplink device 462. If the AP beacon is detected, the alternate uplink device continues network operation via the access point 466.

However, if the AP beacon is not detected by the alternate uplink device, such as the AP beacon not being received by the alternate uplink device for greater than a certain threshold amount of time, this indicates a failure of the access point. In some embodiments, the alternate uplink device is to commence transmission of an alternate beacon with the same network identification as the network beacon of the AP 470, thus operating as a Wi-Fi hotspot or similar operation, and thus causing devices to roam to the alternate uplink device for network connection. The alternate uplink device is then to connect with devices for operation of the network application 474, and is to forward the network traffic for the application via the alternate network uplink of the alternate uplink device 428, which may include any wired or wireless (such as 4G/5G) redundant network connection. This thereby enables the continued operation of the application for the connected devices, including the devices that do not have redundant network links.

In some embodiments, registering an alternate uplink device includes a specific handshake required between the alternate uplink device and the access point, thereby enabling the alternate uplink device to advertise the same network as the access point when the access point goes down. In some embodiments, the access point may turn off the handshake mechanism with the alternate uplink device if required, such as if there are any security concerns and thus the network failover process should be utilized. In some embodiments, the handshake mechanism is implemented as a protocol that is supported on both the access point and the alternate uplink device.

In some embodiments, the alternate uplink device is to continue monitoring for the broadcast of the network beacon of the AP 482, and determine whether the beacon is detected 486. If the AP beacon is not detected, the alternate uplink device is to continue forwarding network traffic for the application via the alternate network uplink 478. Upon the network beacon of the AP being detected, indicating that the access point has resumed operation, the alternate uplink device is to discontinue the broadcast of the alternate beacon and the operation as a Wi-Fi hotspot, and to resume normal network operation via the access point 490.

Figure 5:
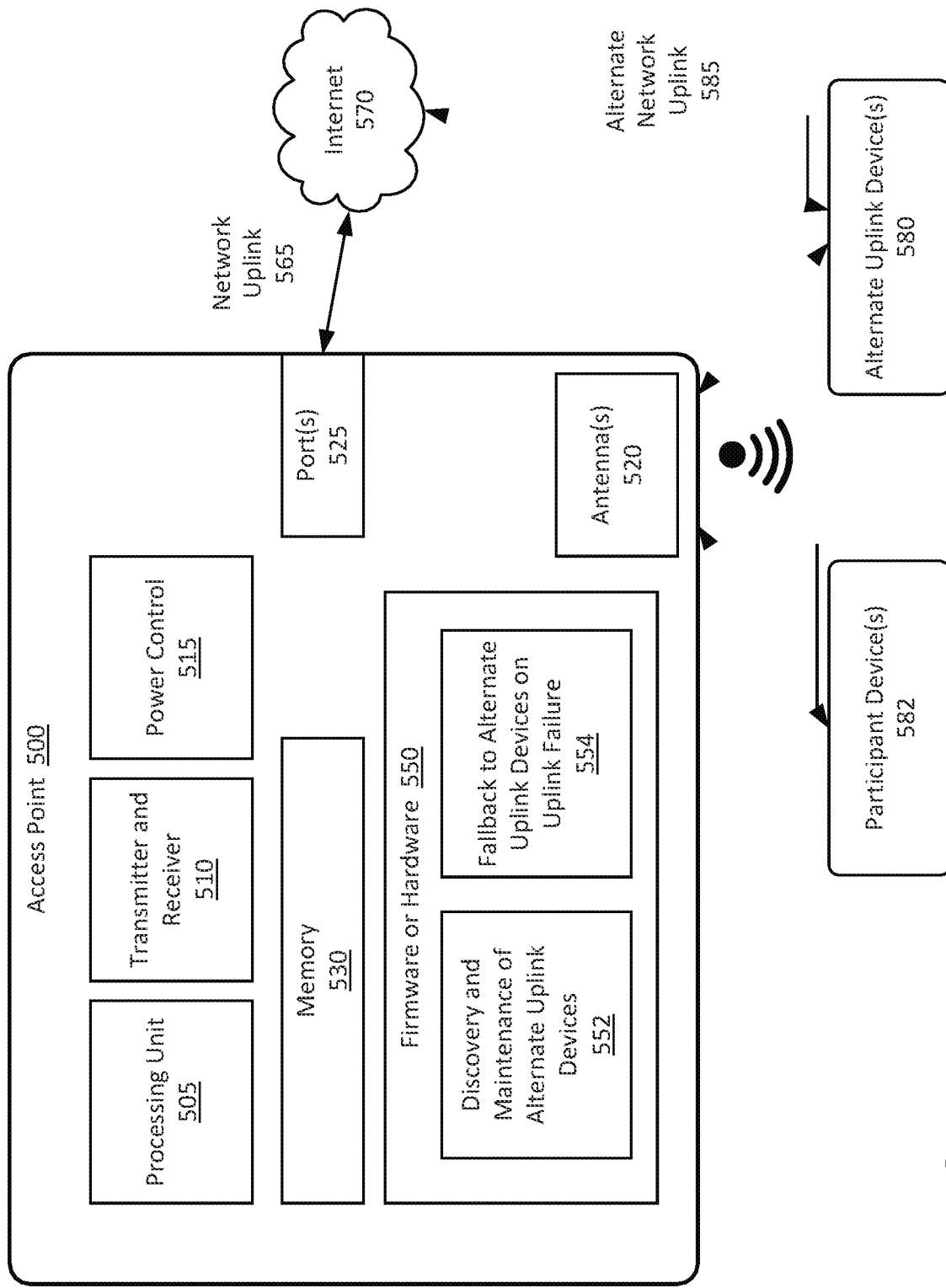
FIG. 5 is block diagram to illustrate an access point to provide alternate network uplink operations, according to some embodiments.

FIG. 5 is block diagram to illustrate an access point to provide alternate network uplink operations, according to some embodiments. An access point includes additional components and elements not illustrated in FIG. 5, which is simplified for sake of illustration. The illustrated access point 500 may include an access point operating under one or more IEEE 802.11 standards.

The access point 500 may include a processing unit 505, a transmitter and receiver 510, power control 515, one or more antennas 520 for wireless signal communication, and one or more ports 525 for wired network connections or other connections, including network uplink 565 to the Internet. The access point 500 may further include memory 530 for storage of data, which may include volatile and nonvolatile memory (including flash memory and similar elements), registers, and other storage technologies.

The access point 500 further includes firmware or hardware or both 550. In some embodiments, the firmware or hardware 550 includes processes or components to provide discovery and maintenance of a list of alternate uplink devices 552, such as illustrated in FIG. 3 for discovery and registration of alternate uplink devices. One or more alternate uplink devices 580 provide alternate network uplinks 585 to the Internet 570 for devices including participant devices 582 that participate in a network application but do not include a redundant network link. The alternate network uplinks may include a wired network connection or a wireless (such as 4G/5G cellular) network connection.

In some embodiments, the firmware or hardware 550 further includes processes or components to provide for fallback to the one or more alternate uplink devices 554 on detection by the access point 500 of a loss of the network uplink 565, such as illustrated in FIG. 4A for operation of alternate network uplinks for network uplink failure.

Figure 6:
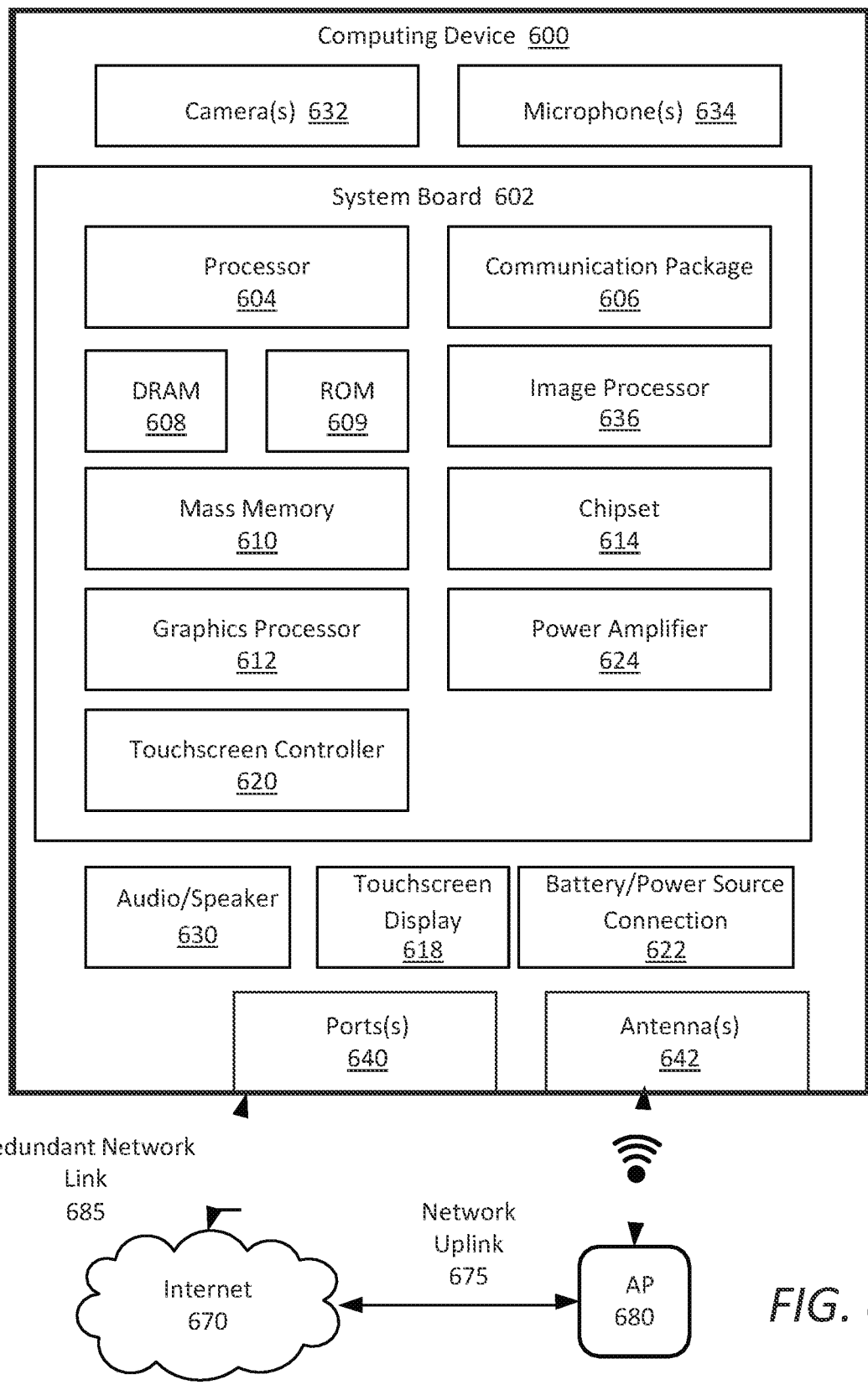
FIG. 6 illustrates a computing device to provide alternate network uplink operations, according to some embodiments.

FIG. 6 illustrates a computing device to provide alternate network uplink operations, according to some embodiments. In some embodiments, the computing device 600 may include an alternate uplink device to communicate with an access point 680 in network, the computing device 600 further including a redundant network link 685 to the Internet 670. The computing device may include, for example, the mobile device 230 including a wireless redundant Internet connection 235 or the desktop computer 270 including a wired redundant Internet connection 275 as illustrated in FIG. 2C. In some embodiments, the computing device 600 is to provide an alternate network uplink to the Internet 670 for one or more other devices upon loss of the network connection, such as by loss of the network uplink 675 or failure of the access point 680.

Computing device 600 houses a system board 602. The system board 602 may include a number of components, including but not limited to a processor 604 and at least one communication package or chip 606. The communication package 606 is coupled to one or more antennas 642. The computing device may further includes volatile memory (e.g., DRAM) 608, nonvolatile memory (e.g., ROM) 609, flash memory (not shown), a graphics processor 612, a chipset 614, a display 618 such as a touchscreen display, a touchscreen controller 620, a battery or power source connection 622, a power amplifier 624, a speaker or other audio element 630, one or more cameras 632, a microphone array 634, a mass storage device (such as a solid state drive or hard disk drive) 610, and one or more ports 640 for wired connection. These components may be connected to the system board 602, mounted to the system board, or combined with any of the other components.

In various implementations, the computing device 600 may be, for example, a laptop, a netbook, a notebook, an Ultrabook, a smartphone, a tablet, an ultra-mobile PC, a mobile phone, a desktop computer, or a server. The computing device may be fixed, portable, or wearable. In further implementations, the computing device 600 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a wireless access point includes one or more processors; a wireless transmitter and receiver; and a connection for a network uplink, wherein the wireless access point is to: transmit a request to multiple devices connected to the wireless access point regarding redundant network links, identify one or more devices that include redundant network links and that are capable and willing to provide alternate network uplinks, the one or more devices including a first device including a first redundant network link, provide a network operation for one or more devices using the network uplink, upon detecting a loss of the network uplink, transmit a request to at least the first device to enable a first alternate network uplink for the network operation using the first redundant network link, and transmit and receive data for the network operation through the first device for the first alternate network uplink.

In some embodiments, one or more non-transitory computer-readable storage mediums having stored thereon executable computer program instructions that, when executed by one or more processors, cause the one or more processors to perform operations including receiving a request from a wireless access point at a first computing device regarding identification of redundant network links to be used as alternate network uplinks; providing identification for a first redundant network link of the first computing device as a first alternate network uplink; commencing an application utilizing a network uplink through the wireless access point; monitoring a beacon of the wireless access point, the beacon including a first network identifier; upon determining that the beacon of the access point is not detected, broadcasting an alternate beacon with the first network identifier; and providing network access to one or more other computing devices for the application using the first alternate network uplink.

In some embodiments, a method includes identifying a one or more computing devices that are connected with a wireless access point and that include redundant Internet links to be used as alternate network uplinks; providing an application for multiple computing devices using an Internet uplink of the wireless access point; and providing a failover to at least a first alternate network uplink using a redundant Internet link of a first computing device of the one or more identified computing devices upon a loss of an Internet connection for the multiple computing devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A wireless access point comprising;
a memory;
a wireless transmitter and receiver; and
one or more processors configured to:
perform network operations using one or more redundant internet links;
maintain, in the memory, a list comprising a plurality of devices connected to the wireless access point via a plurality of network uplinks;
transmit a request regarding redundant operation of one or more internet links to identify the plurality of devices connected to the wireless access point,
identify one or more devices of the plurality of devices that are operating on one or more redundant internet links and that are capable and willing to provide one or more alternate network uplinks to the wireless access point, the one or more devices including a first device linked to a first redundant internet link,
transmit a request to at least the first device to enable a first alternate network uplink for the network operation using the first redundant internet link upon detecting an abnormal behavior of at least one network uplink of the plurality of network uplinks,
transmit and receive data for the network operation through the first device for the first alternate network uplink, and
transmit and receive data for network operation through a second device for a second alternate network uplink along with the first alternate network uplink upon detecting an imbalance in network operation load.

2. The wireless access point of claim 1, wherein the wireless access point is further to:
determine that the network uplink is operating normally; and
resume providing the network operation for the one or more devices using the network uplink.

3. The wireless access point of claim 1, wherein identifying the one or more devices includes the wireless access point to access the network via the one or more internet links.

4. The wireless access point of claim 1, wherein the network operation includes streaming of data.

5. The wireless access point of claim 1, wherein the network is the Internet.

6. The wireless access point of claim 5, wherein the first redundant internet link includes a wired or wireless Internet link.

7. One or more non-transitory computer-readable storage mediums having stored thereon executable computer program instructions that, when executed by one or more processors, cause the one or more processors to perform operations comprising:
receiving a request from a wireless access point at a first computing device regarding identification of one or more redundant internet links to be used as alternate network uplinks;
identifying a first redundant internet link of the first computing device as a first alternate network uplink;
monitoring a broadcast by an access point network beacon to determine that the access point is detected, the access point beacon including a first network identifier;
upon determining that the beacon of the access point is not detected, broadcasting an alternate beacon with the first network identifier;
providing network access to one or more other computing devices for an application using the first alternate network uplink, the first alternate network uplink having the first network identifier;
transmit and receive data for the network operation through a first device for the first alternate network uplink, and
transmit and receive data for network operation through a second device for a second alternate network uplink along with the first alternate network uplink.

8. The one or more storage mediums of claim 7, further including instructions for:
detecting the beacon of the wireless access point;
disabling the broadcast of the alternate beacon; and
resume utilizing the network uplink through the wireless access point for the application.

9. The one or more storage mediums of claim 7, further including instructions for:

conducting a handshake between the wireless access point and the first computing conducting a handshake between the wireless access point and the first computing device to authorize the first computing device to broadcast the alternate beacon with the first network identifier.

10. The one or more storage mediums of claim 7, wherein the application includes streaming of data.

11. The one or more storage mediums of claim 7, wherein the network is the Internet.

12. The one or more storage mediums of claim 11, wherein the first alternate network uplink includes a wired or wireless Internet link.

13. The one or more storage mediums of claim 7, wherein the network identifier of the beacon is an SSID (Service Set Identifier).

14. A method comprising:
identifying a one or more computing devices that are connected with a wireless access point and that include redundant Internet links to be used as alternate network uplinks;
providing an application for a plurality of computing devices using an Internet uplink of the wireless access point;
providing a failover to at least a first alternate network uplink using a redundant Internet link of a first computing device of the one or more identified computing devices upon a loss of an Internet connection for the plurality of computing devices;
transmitting and receiving data for a network operation through a first device for the first alternate network uplink, and
transmitting and receiving data for the network operation through a second device for a second alternate network uplink along with the first alternate network uplink.

15. The method of claim 14, wherein providing the failover includes:
upon the wireless access point detecting a failure of the Internet uplink, the wireless access point to transmit a request to at least the first computing device to enable the first alternate network uplink for the application, and to transmit and receive data for the application through the first computing device for the first alternate network uplink.

16. The method of claim 15, wherein, upon the wireless access point further determining that the Internet uplink has resumed operation, the wireless access point to resume providing the application for the plurality of computing devices using the Internet uplink.

17. The method of claim 14, wherein providing the failover includes:
upon determining that a network beacon of the wireless access point is not detected, the first computing device to transmit an alternate beacon with a same network identifier as the beacon of the wireless access point, and providing network access to one or more of the plurality of computing devices for the application using the first alternate network uplink.

18. The method of claim 17, wherein, upon the first computing device detecting resumption of the beacon of the wireless access point, the first computing device is to disable an broadcast of the alternate beacon, and resume utilizing the Internet uplink through the wireless access point for the application.

19. The method of claim 14, wherein the first redundant Internet link includes a wired or wireless Internet link.

* * * * *